United States Patent
Gupta et al.

(10) Patent No.: US 10,397,046 B1
(45) Date of Patent: *Aug. 27, 2019

(54) CONTEXTUAL STATE-BASED USER INTERFACE NOTIFICATION TRIGGERING

(71) Applicant: Microsoft Technology Licensing, LLC, Redmond, WA (US)

(72) Inventors: Rahul Gupta, Hyderabad (IN); Pradeep Kumar Reddy K, Hyderabad (IN); Bhavesh Sharma, Hyderabad (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/226,077

(22) Filed: Dec. 19, 2018

Related U.S. Application Data (63) Continuation of application No. 15/975,471, filed on May 9, 2018, now Pat. No. 10,200,237.

(51) Int. Cl.
    *H04L 12/58*     (2006.01)
    *H04L 12/24*     (2006.01)
    (Continued)

(52) U.S. Cl.
    CPC ........ *H04L 41/069* (2013.01); *G06F 16/9535* (2019.01); *G06N 20/00* (2019.01);
    (Continued)

(58) Field of Classification Search
    CPC ............... H04W 68/00; H04W 84/045; H04W 36/0022; H04W 76/02; H04W 8/10;
    (Continued)

(56) References Cited

U.S. PATENT DOCUMENTS 8,914,399 B1 * 12/2014 Paleja ................. G06F 16/9535
    707/767
9,612,847 B2 * 4/2017 Deutsch ............... G06F 3/0482
(Continued)

OTHER PUBLICATIONS

Sarikaya, Ruhi, "The Technology Behind Personal Digital Assistants: An overview of the system architecture and key components", In Journal of IEEE Signal Processing Magazine, vol. 34, Issue 1, Jan. 2017, pp. 67-81.
(Continued)

*Primary Examiner* — Nimesh Patel
(74) *Attorney, Agent, or Firm* — Goff IP Law PLLC; Jared Goff (57) ABSTRACT

Triggering of user interface notifications can be managed for a plurality of computer applications via a digital assistant, which can include a notification triggering engine. The managing can include selecting a time to trigger a user interface notification from a computer application of the plurality of computer applications. The selecting can use the data representing a current contextual user interface activity computer state. The current contextual user interface activity state can be a state other than a state of the digital assistant, the triggering engine, or a state of the computer application. The technique can further include, in response to the selecting of the time, triggering the notification in the computer system at the selected time via the digital assistant. Further, the technique can include responding to the triggering of the notification by presenting the notification on a user interface device in the computer system.

20 Claims, 6 Drawing Sheets

(51) Int. Cl.
*H04M 1/725* (2006.01)
*G06N 20/00* (2019.01)
*G06F 16/9535* (2019.01)
*H04L 29/08* (2006.01)

(52) U.S. Cl.
CPC ...... *H04L 67/306* (2013.01); *H04M 1/72569* (2013.01); *H04L 51/04* (2013.01)

(58) Field of Classification Search
CPC ..... H04W 76/021; H04W 92/02; H04W 4/10; H04W 76/005; H04W 52/0251; H04W 52/0254; H04W 12/06; H04W 12/08; H04W 4/001; H04W 60/00; H04W 60/04; H04W 8/04; H04W 8/26; H04W 36/00; H04W 36/0066; H04W 72/04; H04W 68/02; H04W 4/005; H04W 4/06; H04W 64/003; H04W 72/02; H04W 88/04; H04W 88/182; H04W 8/06; H04W 36/0072; H04W 68/005; H04W 28/0289; H04W 36/24; H04W 24/02; H04W 72/0486; H04W 88/06; H04W 36/0055; H04W 48/18; H04W 84/005; H04W 88/02; H04W 8/16; H04W 4/025; H04W 4/02; H04W 4/04; H04W 4/60; H04W 64/00; H04W 12/02; H04W 4/021; H04W 4/023; H04W 4/027; H04W 4/029; H04W 4/08; H04W 4/16; H04W 4/18; H04W 4/12; H04W 76/12; H04W 76/32; H04W 4/00; H04W 4/80; Y02D 70/1242; Y02D 70/146; Y02D 70/1224; Y02D 70/1262; Y02D 70/1222; Y02D 70/126; Y02D 70/1264; Y02D 70/142; Y02D 70/144; Y02D 70/23; Y02D 70/24; Y02D 70/21; H04L 12/189; H04L 12/66; H04L 41/0806; H04L 41/5041; H04L 43/0811; H04L 63/104; H04L 63/123; H04L 67/125; H04L 45/70; H04L 49/25; H04L 29/12754; H04L 61/106; H04L 61/3085; H04L 61/605; H04L 65/1006; H04L 65/104; H04L 65/105; H04L 47/808; H04L 47/824; H04L 47/29; H04L 43/00; H04L 63/162; H04L 65/1016; H04L 65/1069; H04L 67/22; H04L 65/4084; H04L 65/80; H04L 67/148; H04L 67/30; H04L 29/08693; H04L 47/821; H04L 51/08; H04L 51/20; H04L 51/22; H04L 51/26; H04L 63/0853; H04L 63/10; H04L 63/1408; H04L 65/40; H04L 65/601; H04L 67/02; H04L 67/16; H04L 51/36; H04L 67/306; H04L 51/00; H04L 51/04; H04L 67/303; H04L 51/24; H04L 51/043; H04L 51/12; H04L 51/18; H04L 67/26; H04L 41/12; H04L 41/145; H04L 51/32; H04L 12/1813; H04L 12/1859; H04L 51/10; H04L 43/0876; H04L 47/826; H04L 63/0428; H04L 63/08; H04L 63/102; H04L 67/14; H04L 67/32; H04L 51/02; H04L 12/1818; H04L 12/4633; H04L 67/12; H04L 67/18; H04L 29/08081; H04L 65/403; H04L 67/00; H04Q 3/0025; H04Q 2213/13093; H04Q 2213/13096; H04Q 2213/13098; H04Q 2213/13176; H04Q 2213/13196; H04Q 2213/13204; H04Q 2213/13294; H04Q 2213/13298; H04Q 2213/13349; H04Q 2213/1338; H04Q 2213/13383; H04Q 2213/13389; H04Q 3/0016; G06Q 30/02; G06Q 10/109; G06Q 50/01; G06Q 10/10; G06Q 30/0269; G06Q 10/06311; G06Q 10/107; G06Q 30/0267; G06Q 30/0255; G06Q 30/0261; G06Q 30/0264; G06Q 50/22; G06Q 10/1095; G06Q 10/101; G06Q 50/10; G06Q 10/063114; G06Q 10/0639; G06Q 10/1093; G06Q 30/0224; G06Q 30/0226; G06Q 50/12; H04H 60/31; H04H 60/54; H04H 60/70; H04M 11/00; H04M 3/42365; H04M 15/8033; H04M 1/72569; H04M 2203/2038; H04M 2203/551; H04M 2250/12; H04M 7/0033; H04M 1/72572; H04M 2203/65; H04M 15/28; H04M 15/80; H04M 15/8044; H04M 15/8055; H04M 15/85; H04M 15/852; H04M 15/88; G10L 15/30; G10L 15/183; G10L 15/22; G10L 2015/0631; G10L 15/26; G10L 17/22; G10L 2015/088; G10L 2015/223; G10L 25/48; G10L 15/16; G10L 15/20; G06F 17/30528; G06F 17/30867; G06F 17/3053; G06F 17/30554; G06F 17/30; G06F 17/30265; G06F 17/30699; G06F 17/3087; G06F 19/00; G06F 2221/2111; G06F 3/04847; G06F 9/54; G06F 17/241; G06F 17/30038; G06F 17/30241; G06F 17/30253; G06F 17/30268; G06F 17/30483; G06F 17/30525; G06F 17/30578; G06F 17/30598; G06F 17/30705; G06F 17/30861; G06F 17/30864; G06F 17/30873; G06F 21/316; G06F 21/53; G06F 21/6245; G06F 3/0484; G06F 9/451; A61B 5/0205; A61B 5/02438; A61B 5/7275; A61B 5/7475; A61B 5/721; A61B 5/7264; A61B 5/7282; A61B 5/7455

See application file for complete search history.

(56) References Cited

U.S. PATENT DOCUMENTS

| | | | |
|---|---|---|---|
| 10,254,945 B1 | 4/2019 | Gupta et al. | |
| 2011/0072492 A1* | 3/2011 | Mohler | G06F 3/04817 726/3 |
| 2012/0143694 A1* | 6/2012 | Zargahi | G06Q 30/0603 705/14.66 |
| 2014/0240122 A1 | 8/2014 | Roberts et al. | |
| 2017/0111761 A1* | 4/2017 | Tarlton | G06F 9/45558 |
| 2017/0201592 A1 | 7/2017 | Hall et al. | |
| 2018/0084104 A1 | 3/2018 | Chang | |

OTHER PUBLICATIONS

"International Search Report and Written Opinion issued in PCT Application No. PCT/US18/065301", dated May 21, 2019, 16 Pages.
"Notice of Allowance Issued in U.S. Appl. No. 16/281,318", dated Jun. 11, 2019, 18 Pages.
"International Search Report and Written Opinion Issued in PCT Application No. PCT/US2019/024446", dated Jun. 24, 2019, 12 Pages.

\* cited by examiner

CONTEXTUAL STATE-BASED USER INTERFACE NOTIFICATION TRIGGERING

RELATED APPLICATIONS

The present application is a continuation of U.S. application Ser. No. 15/975,471, filed May 9, 2018, entitled Contextual State-Based User Interface Notification Triggering, which is incorporated herein by reference. If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

BACKGROUND

Different applications with server-based or cloud components can send server trigger notifications on user devices through server push notifications. For example, some of these notifications may be promotional, while others may be related to the user data with the application. Today, the management of these notifications, including managing when to trigger notifications for which users, is performed by the different applications for their own notifications.

SUMMARY

The separate notification-providing applications often do not have access to data about the current context of the activity on user device. On some devices such as mobile devices, there is such an influx of notifications on user devices being provided without regard to the current context of the activity on the user device that most of the notifications go unnoticed and even the important notifications get cleared off by users in the clutter. This can waste computer resources and can decrease the usability of the computer system. The tools and techniques discussed herein relate to contextual state-based user interface notification triggering.

In one aspect, the tools and techniques can include managing triggering of user interface notifications for a plurality of computer applications via a digital assistant, which can include a notification triggering engine and can operate in a computer system. The managing can include selecting a time to trigger a user interface notification from a computer application of the plurality of computer applications. The selecting can use data representing a current contextual user interface activity state in the computer system. The current contextual user interface activity state can be a state other than a state of the digital assistant or a state of the computer application (though one or more states of the digital assistant and/or the computer application may also be used). The technique can further include, in response to the selecting of the time, triggering the notification in the computer system at the selected time via the digital assistant. Further, the technique can include responding to the triggering of the notification by presenting the notification on a user interface of a user interface device in the computer system.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Aspects described herein are directed to techniques and tools for improved triggering of user interface notifications on user computing devices. Such improvements may result from the use of various techniques and tools separately or in combination.

Such techniques and tools may include a framework including a notification manager that draws knowledge of current context of the user profile based on multiple signals or context-indicating data, such as device usage, application usage, browser usage, search engine usage, location, emails, short messaging service messages, and/or other signals. The notification manager can trigger the notifications from applications relevant to the current context of the user profile on the user profile's current active device. Some of these signals can be point in time, and tell the current activity of the user, while others can lead to the learned knowledge or inferences about the user from behavioral patterns, and user habits.

In an implementation, the computer system can provide an infrastructure for skills and service providers (applications) to leverage for sending notifications to the user relevant to the current context and learned user behavior. This can be a generalized framework that can be used by an overall application such as a personal assistant, by first party applications or skills, and it may even be exposed to third party applications, such as through application programming interfaces. Following is a discussion of some of the major components and operations in an example framework:

Client-side components of the notification manager (such as components of a digital assistant) can be present across multiple different devices running a user profile. Thus, the system can track user profile events and user input activity from various signals, such as email, short messaging service, geo-location history, browsing history, web search history, app usage, device usage, and/or other signals. These different signals from user interface devices can include useful information for selecting times to trigger notifications. Machine learning, statistical analysis, behavioral analytics and/or data mining techniques can be applied to these signals to derive user profile task correlations, leading to a context graph (such as the triggering models discussed below) for the user profile. These signals can be used to derive the learned behavior about the user profile in the form of inferences, which can be stored in a user profile data store and can be used by a real-time context understanding component, which can provide data representing user profile activity on a device, application, file, and/or other computer component.

This framework that includes the notification manager can avoid exposing the user signals and learned behavior to third party applications. Instead, the notification manager can expose general categories and tags to which the applications can map their notifications. This can build user trust and make the system more secure and private by keeping the user-specific data with the central service (such as with the digital assistant), rather than allowing such personal data to be transmitted to the other applications. Such a system can also conveniently provide central settings to the user profile, which the user profile can use to turn on/off certain notifications from the applications through user input, such as for a given category, or from a given application.

The notification manager can provide a common notifications queue for notifications from the digital assistant, from first party applications (from the same developer as the digital assistant and the notifications manager) and from third party applications, in which user interface notifications from multiple such applications can be queued up. The notification manager can provide various tags and categories to which these notifications are mapped by the application providers and based on applied machine learning on notifications content and metadata. Thus, the notification manager can provide notifications at more optimal times based on current context, which can improve user engagement on the notifications, whether those notifications are from a digital assistant that includes the notification manager, from first party applications from the same developer as the digital assistant and operating on the same service, or from third party applications from other developers and services.

Based on the learned user behavior and user habits, the notification manager can deliver the skills notifications to the user at more appropriate times. Many of the user activities such as travel bookings and entertainment bookings can be point-in-time and the framework can take care of delivering those notifications at the right time. Further, some of the notifications content gets more engagement based on what the user is doing currently on a user interface device. The notification manager can also consider real time signals for these notifications to trigger the relevant notifications for the current user context.

Current notification platforms today are either "fire and forget," or applications can individually manage the user learning from notifications engagement. The notification manager discussed herein can provide common learning from user engagement on the notifications to learn the user profile's behavior over time and customize the delivery of notifications per user profile behavior and can do this for multiple applications. Further, the notification manager can learn from world knowledge (e.g., from notification activities of other user profiles) based on the different categories of skills and the demographics-based user behavior. Such learning can become an input for notification delivery determinations, such as by such learning being used to tune or train machine learning models that are then used at runtime to process data representing current contextual activity.

The notification manager and related techniques discussed herein can improve the computer system, making it more valuable and effective for users and application providers. For example, for users the notification manager can present notification content the user might be interested in based on current context such as user interface activity. The notification manager can also be a valuable computer feature for application providers by delivering the application's notifications at better times, leading to higher engagement with the notifications and the applications. The notification manager can also reduce wasted usage of computer resources such as computer memory, processor, and computer display usage. For example, such computer resources can be wasted when user interface notifications are presented at times when they are likely to be delayed and re-displayed later, or even completely ignored. The notification manager can consider data indicating current contextual state of user interfaces and other computer features when selecting a time to present a notification, resulting in more efficient presentation of notifications and less waste of computer resources, such as memory and processor usage.

The notifications can be presented to user profiles and the system can consider computer system actions taken by those user profiles when selecting a time to trigger a notification. As used herein, a user profile is a set of data that represents an entity such as a user, a group of users, a computing resource, etc. When references are made herein to a user profile performing actions (sending, receiving, etc.), those actions are considered to be performed by a user profile if they are performed by computer components in an environment where the user profile is active (such as where the user profile is logged into an environment and that environment controls the performance of the actions). Often such actions by or for a user profile are also performed by or for a user corresponding to the user profile. For example, this may be the case where a user profile is logged in and active in a computer application and/or a computing device that is performing actions for the user profile on behalf of a corresponding user. To provide some specific examples, this usage of terminology related to user profiles applies with reference to a user profile providing user input, receiving responses, or otherwise interacting with computer components discussed herein.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Moreover, for the sake of simplicity, flowcharts may not show the various ways in which particular techniques can be used in conjunction with other techniques.

Techniques described herein may be used with one or more of the systems described herein and/or with one or more other systems. For example, the various procedures described herein may be implemented with hardware or software, or a combination of both. For example, the processor, memory, storage, output device(s), input device(s), and/or communication connections discussed below with reference to FIG. 1 can each be at least a portion of one or more hardware components. Dedicated hardware logic components can be constructed to implement at least a portion of one or more of the techniques described herein. For example and without limitation, such hardware logic components may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc. Applications that may include the apparatus and systems of various aspects can broadly include a variety of electronic and computer systems. Techniques may be implemented using two or more specific interconnected hardware modules or devices with related control and data signals that can be communicated between and through the modules, or as portions of an application-specific integrated circuit. Additionally, the techniques described herein may be implemented by software programs executable by a computer system. As an example, implementations can include distributed processing, component/object distributed processing, and parallel processing. Moreover, virtual computer system processing can be constructed to implement one or more of the techniques or functionality, as described herein.

In utilizing the tools and techniques discussed herein, privacy and security of information can be protected. This may include allowing opt-in and/or opt-out techniques for securing users' permission to utilize data that may be associated with them, and otherwise protecting users' privacy. Additionally, security of data can be protected, such as by encrypting data at rest and/or in transit across computer networks and requiring authenticated access by appropriate and approved personnel to sensitive data. Other techniques for protecting the security and privacy of data may also be used.

I. Exemplary Computing Environment

Figure 1:
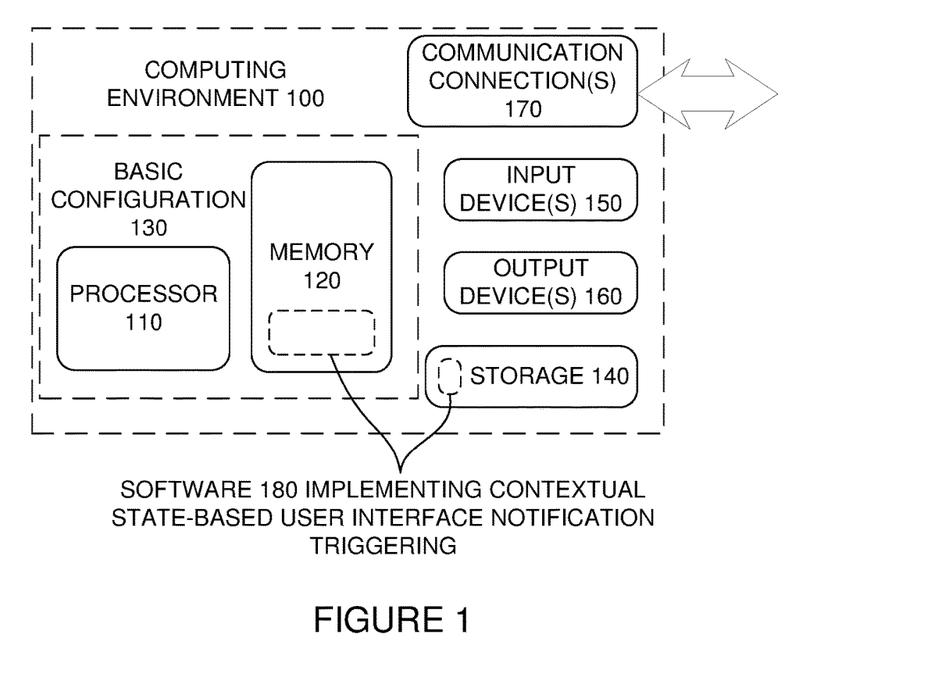
FIG. 1 is a block diagram of a suitable computing environment in which one or more of the described aspects may be implemented.

FIG. 1 illustrates a generalized example of a suitable computing environment (100) in which one or more of the described aspects may be implemented. For example, one or more such computing environments can be used as a user interface computer device and/or another computer device that can be part of a notification management service, application service, user interface device, or another computer in a contextual user interface notification triggering computer system. Generally, various different computing system configurations can be used. Examples of well-known computing system configurations that may be suitable for use with the tools and techniques described herein include, but are not limited to, server farms and server clusters, personal computers, server computers, smart phones, laptop devices, slate devices, game consoles, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse types of computing environments.

With reference to FIG. 1, various illustrated hardware-based computer components will be discussed. As will be discussed, these hardware components may store and/or execute software. The computing environment (100) includes at least one processing unit or processor (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing contextual state-based user interface notification triggering. An implementation of contextual state-based user interface notification triggering may involve all or part of the activities of the processor (110) and memory (120) being embodied in hardware logic as an alternative to or in addition to the software (180).

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component (e.g., if the display device includes a touch screen). Also, processors have memory. The inventors hereof recognize that such is the nature of the art and reiterate that the diagram of FIG. 1 is merely illustrative of an exemplary computing device that can be used in connection with one or more aspects of the technology discussed herein. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The memory (120) can include storage (140) (though they are depicted separately in FIG. 1 for convenience), which may be removable or non-removable, and may include computer-readable storage media such as flash drives, magnetic disks, magnetic tapes or cassettes, CD-ROMs, CD-RWs, DVDs, which can be used to store information and which can be accessed within the computing environment (100). The storage (140) stores instructions for the software (180).

The input device(s) (150) may be one or more of various different input devices. For example, the input device(s) (150) may include a user device such as a mouse, keyboard, trackball, etc. The input device(s) (150) may implement one or more natural user interface techniques, such as speech recognition, touch and stylus recognition, recognition of gestures in contact with the input device(s) (150) and adjacent to the input device(s) (150), recognition of air gestures, head and eye tracking, voice and speech recognition, sensing user brain activity (e.g., using EEG and related methods), and machine intelligence (e.g., using machine intelligence to understand user intentions and goals). As other examples, the input device(s) (150) may include a scanning device; a network adapter; a CD/DVD reader; or another device that provides input to the computing environment (100). The output device(s) (160) may be a display, printer, speaker, CD/DVD-writer, network adapter, or another device that provides output from the computing environment (100). The input device(s) (150) and output device(s) (160) may be incorporated in a single system or device, such as a touch screen or a virtual reality system.

The communication connection(s) (170) enable communication over a communication medium to another computing entity. Additionally, functionality of the components of the computing environment (100) may be implemented in a single computing machine or in multiple computing machines that are able to communicate over communication connections. Thus, the computing environment (100) may operate in a networked environment using logical connections to one or more remote computing devices, such as a handheld computing device, a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media, which may be storage media or communication media. Computer-readable storage media are any available storage media that can be accessed within a computing environment, but the term computer-readable storage media does not refer to propagated signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various aspects. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," "manage", "trigger", "present", and "operate" to describe computer operations in a computing environment. These and other similar terms are high-level descriptions for operations performed by a computer and should not be confused with acts performed by a human being, unless performance of an act by a human being (such as a "user") is explicitly noted. The actual computer operations corresponding to these terms vary depending on the implementation.

II. Contextual State-Based User Interface Notification Triggering System

Communications between the various devices and components discussed herein can be sent using computer system hardware, such as hardware within a single computing device, hardware in multiple computing devices, and/or computer network hardware. A communication or data item may be considered to be sent to a destination by a component if that component passes the communication or data item to the system in a manner that directs the system to route the item or communication to the destination, such as by including an appropriate identifier or address associated with the destination. Also, a data item may be sent in multiple ways, such as by directly sending the item or by sending a notification that includes an address or pointer for use by the receiver to access the data item. In addition, multiple requests may be sent by sending a single request that requests performance of multiple tasks.

A. Components of Contextual User Interface Notification Triggering System

Figure 2:
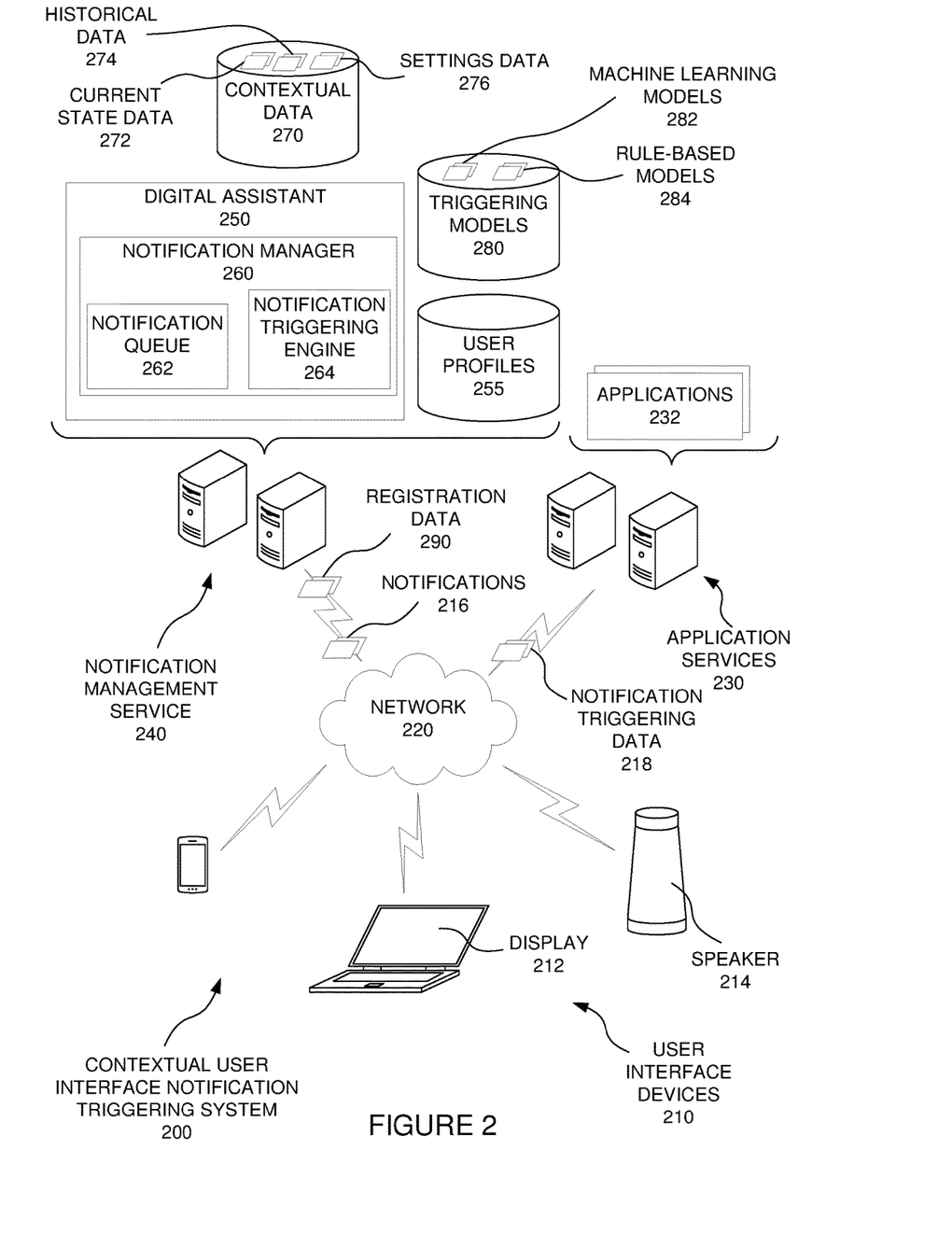
FIG. 2 is schematic diagram of a contextual user interface notification triggering computer system.

Referring now to FIG. 2, components of a computerized contextual state-based user interface notification triggering system (200) will be discussed. Each of the components includes hardware and may also include software. For example, a component of FIG. 2 can be implemented entirely in computer hardware, such as in a system on a chip configuration. Alternatively, a component can be implemented in computer hardware that is configured according to computer software and running the computer software. The components can be distributed across computing machines or grouped into a single computing machine in various different ways. For example, a single component may be distributed across multiple different computing machines (e.g., with some of the operations of the component being performed on one or more client computing devices and other operations of the component being performed on one or more machines of a server).

Referring still to FIG. 2, the system (200) can include user interface devices (210), which can be client devices in the system (200), such as smartphones, desktop computers, laptop computers, tablets, intelligent speaker devices, and/or other user interface devices (210) that each can include one or more subsidiary user interface devices, such as displays (212), speakers (214), microphones, touch sensors, and/or motion-sensing cameras.

The user interface devices (210) can communicate with other computing devices by sending and receiving computer-readable data through a computer network (220) to receive user interface notifications (216), as is discussed in more detail below. For example, the user interface devices (210) may communicate with one or more application services (230), which can provide applications (232). The applications (232) may be running on the application services (230) remote from the user interface devices (210) as illustrated in FIG. 2 and/or in the user interface devices (210). For example, an application (232) may include a component running in an application service (230) and another component running in a user interface device (210), with the two components communicating with each other through the network (220).

The system (200) can also include a notification management service (240), which can host a digital assistant (250), which can provide digital assistant services to user profiles (255) on the user interface devices (210). The user profiles (255) may be managed by the digital assistant (250) and/or by some other computer component. As used herein, a digital assistant is a computer component that can receive natural language instructions and respond with natural language scripts in a dialog using a user interface device (210). The digital assistant (250) may provide many different features or services to the user interface devices (210). For example, the digital assistant (250) can include a notification manager (260), which can manage notifications that are provided by applications (232) to the user interface devices (210). This may include managing applications (232) running as components of the digital assistant (250) (e.g., plugins or skills running as part of the digital assistant (250)) and/or running outside the digital assistant (250). Whether running inside and/or outside the digital assistant (250), the applications (232) can provide notifications (216) and other data such as notification triggering data (218) to the notification manager (260) in the digital assistant (250). As with the applications (232), the digital assistant (250) can include a component running in the notification management service (240) remotely from the user interface devices (210). Also, the notification manager (260) can run independent of a digital assistant (250) and may run outside the digital assistant (250), but exchange data with the digital assistant (250).

The notification manager (260) can receive registration data (290) for notifications (216). For example, registration data (290) may indicate an application (232) from which notifications (216) are to be provided, and a user profile (255) to which the notifications (216) are to be provided. Thus, the notification manager (260) may receive registration data (290) from user profiles (255) through user interface devices (210), indicating that the user profiles (255) have opted into contextual notification triggering through user input. The notification manager (260) can also receive registration data (290) from applications (232), indicating that the applications (232) have opted into having their notifications (216) processed using contextual notification triggering. An application (232) may opt in for all its notifications, or for only some of its notifications. For example, an application (232) may include an indication in the notification triggering data (218) of whether that individual notification is subject to contextual notification triggering. If a notification (216) is not subject to the contextual notification triggering, the notification (216) can be immediately triggered without regard to current context state as indicated in the contextual data (270). Also, opt-out techniques may be used in addition to, or instead of, opt-in techniques. The notification manager (260) can expose data communication interfaces for sending and receiving notification-related data between the notification manager (260) and the applications (232). For example, the notification manager (260) may expose application programming interfaces through which application programming interface calls can be made between the notification manager (260) and the applications (232).

The notification triggering data (218) can include data packages sent by the applications (232) with the notifications (216). Those data packages can be used by the notification manager (260) to select triggering times for the associated notifications (216). For example, the notification triggering data (218) for a notification (216) may indicate a category for the notification. For example, for a shopping application, categories could include notifications about product discounts, notifications about order status, notifications about payments, and/or other categories. As another example, notification triggering data (218) for a notification (216) may indicate that the corresponding notification (216) is not to be triggered while the current state data (272) indicates a current driving mode (where the current state data (272) indicates a user is driving an automobile).

The notification manager (260) can include a notification queue (262), which can include queued data items that include notifications (216) and/or be linked to the notifications (216). Whether the items in the notification queue (262) include or reference the notifications (216), the corresponding notifications (216) may be considered to be in the notification queue (262) as discussed herein. The notification manager (260) can also include a notification triggering engine (264), which can use contextual data (270) to select times for triggering the notifications (216) in the notifications queue (262).

The notification manager (260) can retrieve the contextual data (270) in one or more different ways. For example, the notification manager (260) may include components on user interface devices (210), which can gather the contextual data (270) and send it to the component of the notification manager (260) running in the notification management service (240). The notification manager (260) may receive some of the contextual data (270) from other applications that have collected the data, such as from the applications (232). And some of the contextual data may be retrieved in other ways.

The contextual data (270) can include different types of data that can provide contextual information regarding a notification (216), thereby informing the selection of a notification triggering time for that notification (216) by the notification triggering engine (264). For example, the contextual data (270) may include current state data (272), which can encode information about a current state in the computer system (200) relevant to presentation of the current notification (216). Such current state data (272) may include data encoding a state from a current time when the notification triggering engine (264) is selecting a triggering time for a notification. Also, the current state data (272) may include data encoding a state from the recent past that indicates a current state. For example, data indicating an individual application is being actively used one second prior to the triggering time being selected, can indicate that the individual application is still being actively used when the triggering time is selected. The contextual data (270) may also include historical data (274), which can encode historical information from previous times. Historical data (274) is data that far enough back in time that the historical data (274) is not being used by the notification manager (260) to indicate that a current state at the time that a triggering time is being selected is the same as the state indicated in the historical data (274).

The current state data (272) can be data indicating states other than a state of the digital assistant (250), a state of an application (232), or a state of a notification (216) whose triggering time is being selected. In addition, the current state data (272) may also include data indicating states of the digital assistant (250), the application (232), and/or the notification (216) whose triggering time is being selected. For example, the current state data (272) may include battery data indicating a current level of charge in the battery of a user interface device (210) upon which the notification (216) is to be presented. As another example, the current state data (272) may include local time data indicating a current local time in a specified time zone, such as a local time for the user interface device (210) upon which the notification (216) is to be presented. As another example, the current state data (272) may include current browsing state data indicating a current state of browsing data such as Web pages by a user interface device (210) and/or a user profile (255). As yet another example, the current state data (272) may include an indication of which, if any, application (232) is in focus in a user interface device (210) (i.e., currently being presented through an output of a user interface device (210), such as on a speaker or a visual display). As yet another example, the current state data (272) may include an indication of current usage of a mail application or other category of application (232). Also, the current state data (272) can indicate a level of interaction with one or more devices or applications. For example, a level of interaction may be lower if a user interface device (210) is merely outputting audio without recent user input, and higher if a substantial number of user input actions have recently been provided on the user interface device (210), e.g., to browse through different audio tracks in a music playing application (232). For example, such a level of interaction may be quantified as the number of user input actions in a period of time (such as user input actions directed at a display (212) and/or user input actions in the form of natural language voice commands to a digital assistant (250)). As another example, the current state data (272) can include an overall status of the notification queue (262), such as how many other notifications (216) are currently in the notification queue (262). For example, if there are more notifications in the notification queue, that may make it more likely that the notification triggering engine (264) will select a current time to trigger an individual notification (216). As another example, the current state data (272) may include an indicator of a quantity of notifications that have recently been presented to the user profile (255), and/or presented on a particular user interface device (210). For example, this could indicate a number of notifications (216) that have been presented in a particular time period, such as the past thirty seconds, the past minute, or the past five minutes. If more notifications have been presented in this time period, this can indicate that the current state is overloaded with notifications and can weigh in favor of delaying the triggering of the notification (216) currently being considered by the notification triggering engine (264).

The notification manager (260) can also use historical data (274). Historical data (274) can include the same types of data examples given above for the current state data (272), over a particular time period. The historical data (274) may also include data indicating user input provided in response to individual notifications (216). Accordingly, the historical data (274) may include data indicating the contextual data at the time of or immediately preceding the triggering and presentation of a notification (216), along with an indication of the user input response to that notification (216). For example, the user input response may be to ignore the notification, to select and then dismiss the notification, to select the notification and then take some action suggested by the notification, etc. Such historical data (274) may include historical data regarding notifications (216) presented to the same user profile (255) for which a time is being selected to trigger a notification (216). The historical data may also include historical data regarding notifications presented to user profiles (255) other than the user profile (255) for which a time is being selected to trigger a notification (216).

The contextual data (270) can also include settings data (276). The settings data (276) may include data indicating settings for a user profile (255) to which the notification (216) is to be provided. The settings data (276) may also include data indicating settings for the notification (216) itself, such as a priority for the notification (216) and a category of the notification (216) and/or the application (232) that is providing the notification (216). For example, an application (232) may be categorized as an entertainment application, a productivity application, a shopping application, or some other category of application.

The notification triggering engine (264) can use one or more triggering models (280) to process the contextual data (270) and select a triggering time for a corresponding notification (216). For example, the notification triggering engine (264) may use machine learning triggering models (282) and/or rule-based models (284). The rule-based models can include discrete rules that the notification triggering engine (264) applies to the contextual data (270) in selecting a triggering time. For example, a rule-based model (284) may include filtering rules, so that a notification (216) is filtered out and its triggering time delayed so long as the filtering rules indicate that the notification (216) is filtered out. For example, if a filtering rule prohibits all notifications from applications (232) categorized as entertainment applications between 9:00 AM (9:00) and 5:00 PM (17:00) on Monday through Friday, then the notification triggering engine (264) can refrain from triggering notifications from applications (232) categorized as entertainment applications during those times, as indicated by the time data in the current state data (272) and the application category data for the notification in the settings data (276). Similarly, a rule may consider a geographic location indicator in the current state data (e.g., a city name, an address, or latitude and longitude coordinates), and may dictate, for example, that no notifications are to be triggered on a user interface device (210), while that user interface is at a particular geographical address (as indicated by global positioning system data or other positioning data provided using the user interface device (210)). Such rules can also apply to other data, such as a priority of the notification (216) in the settings data (276), for example.

A rule-based model (284) may be applied alone, or in combination with a machine learning model (282). For example, the notification triggering engine (264) may apply filtering rules in a rule-based model (284) for a notification (216), and only apply a machine learning model (282) to the contextual data (270) for the notification (216) if the contextual data (270) for the notification (216) passes all the filtering rules in the rule-based model (284).

The machine learning model (282) may be any of various types of machine learning models, such as decision tree models or artificial neural network models. In one example, the machine learning model (282) can include a deep neural network. The machine learning model (282) can be trained or tuned using historical data (274), which can be used as training data. For example, the historical data (274) can include historical context-indicating data of the types discussed above for the current state data (272) and the settings data (276), indicating the context of the historical notifications (216). The historical data (274) can also include data indicating responses to notifications (216) from multiple different user profiles (255).

In an example, a general-purpose machine learning model (282) may be trained with historical data (274) from multiple different user profiles (255) of a digital assistant (250). For example, this training can include operating on the context-indicating data in the historical data (274) to produce results for multiple different notifications (216). For example, the context-indicating data can be converted to a vector, which can be processed using the current machine learning model (282). The output of such processing can yield an output vector, which can include a pattern that can be compared to existing recognized patterns. For example, some such output vector patterns may indicate a high likelihood of user engagement with a notification (216), and other output vector patterns may indicate a low likelihood of user engagement with a notification (216). The results of such pattern matching with the output vector can be compared with the actual user input response to the corresponding notification (216), as recorded in the historical data (274). The machine learning model (282) can then be adjusted to account for discrepancies between user interface responses that were predicted by processing using the machine learning model (282) and user interface responses that actually occurred in response to the notification (216), as indicated in the historical data (274). As an example, this accounting of discrepancies may use machine learning error correction techniques, such as adjusting parameters of the machine learning model (282) using backpropagation for deep neural network models. Once a general machine learning model (282) has been trained, it can be personalized to individual user profiles (255) by using training techniques such as techniques using backpropagation on the historical data (274) representing notifications (216) for a particular user profile (255). Such personalized training can yield a personalized triggering model (280) for a corresponding user profile (255). Such a personalized triggering model (280) may include a machine learning model (282) and/or a rule-based model (284) that is personalized to a user profile (255). Personalized triggering models (280) can be stored in the notification management service (240), where they can be accessed by the notification triggering engine (264) for notifications to be presented to corresponding user profiles (255). Prior to having personalized training data for a user profile (255), a general triggering model (280) can be used.

In using the trained triggering models (280) notification management service (240) to select times to trigger notifications (216), user input can be received at a user interface device (210), indicating that contextual notification triggering is to be performed for a corresponding user profile. For example, this may include providing user input to select a setting to provide contextual notification triggering for one or more applications (232). In response, contextual notification triggering registration data (290) can be provided from the user interface device to the corresponding application(s) (232), and to the notification manager (260) in the notification management service (240). For example, this registration data (290) can be stored in the application (232) and/or the notification management service (240).

The application (232) can send data to the notification management service (240), informing the notification management service (240) that there is a notification (216) to be triggered. This data can include the notification (216) itself, and it may inform the notification management service (240) of one or more user profiles (255) to which the notification (216) applies. Alternatively, the notification manager (260) may include a registration list of user profiles (255) to which a certain type of notification (216) is to be provided. For example, the notification manager (260) may include a list of user profiles (255) for each application (232), so that all notifications from the application (232) are provided to the user profiles (255) on that list. In that situation, the application (232) may provide the notification (216) to the notification manager (260), instructing the notification manager (260) to send notifications to user profiles (255) registered to receive notifications from that application (232). In either case, an entry for the notification (216) and corresponding user profile (255) can be entered in the notification queue (262), and the notification triggering engine (264) can be informed that the notification (216) is entered in the notification queue (262). Such notifications (216) can be triggered separately for different user profiles (255), considering the different contextual data (270) for the different user profiles (255).

Upon being informed that a notification (216) is in the queue, the notification triggering engine (264) can receive the current state data (272) and the settings data (276) that apply to the entry for the notification (216) in the notification queue (262). This current state data (272) and settings data (276) can be operated upon using the triggering model (280) for that notification (216), such as a general or personalized rule-based model (284) and/or a machine learning model (282) for a corresponding user profile (255) to which the notification (216) is to be presented. As an example, the current state data (272) can be retrieved from the notification management service (240), one or more user interface devices (210), and/or other computer devices in the system (200). The notification triggering engine (264) may apply filtering rules from a rule-based model (284) to current state data (272) and settings data (276) for a notification (216). If the filtering rules do not apply, then the current state data (272) and possibly settings data (276) can be processed using a machine learning model (282), which can yield a result. For example, the result can be to affirm triggering the notification (216) presently, or the result can be to wait to trigger the notification (216), and these results may also include confidence values, which may be used by the notification triggering engine (264) in deciding whether to trigger the notification at the present time.

If the application of the triggering models (280) results in the notification triggering engine (264) deciding to delay triggering of the notification (216), then the notification triggering engine (264) may wait for a period of time, collect the current state data (272) again, and repeat the analysis using the triggering models (280) to process the new current state data (272). This analysis and triggering time determination can be repeated by the notification triggering engine (264) while the results of processing the triggering models (280) yields a decision to not trigger the notification (216) now. The notification triggering engine (264) may be programmed with a timeout period, so that if a notification (216) is not triggered within the timeout period, the notification manager will remove the notification (216) from the notification queue (262) and inform the application (232) that the notification was not presented to the user profile (255).

Upon determining that conditions for triggering a notification (216) are met, by analyzing results of processing the contextual data (270) using the triggering model (280) for the notification (216), the notification triggering engine (264) can select a time for triggering the notification. The selected time may be a current time when the time selection is made, or it may be a selected future time. For example, the time may be one second in the future, for example. When the notification is triggered, it can be presented on a user interface device (210) without delays being expressly imposed by the notification manager (260). However, some delays can still be present, such as delays in processing data or transmitting data across a computer network (220).

When triggering a notification, the notification triggering engine (264) can provide the notification (216) to the user interface device in any of various ways. For example, the notification triggering engine (264) may directly push the notification to a user interface device (210) for presentation. As another example, the notification triggering engine (264) may push a redirect-type command to the user interface device (210), prompting the user interface device (210) to retrieve the data for the notification from some other source such as the notification queue (262) and/or the application (232) from which the notification (216) originated. Upon receiving the data for the notification (216) and a triggering command for the notification (216), the receiving user interface device (210) can present the notification on a user interface output device, such as a display (212) and/or a speaker (214).

After presentation of a notification (216), user input responding to the notification can be monitored (such as using a component of the notification manager (260) on the user interface device (210)), and data representing the responsive user input (or lack thereof) can be provided back to the notification management service (240). The notification management service (240) can associate such user input response data with the other contextual data (270) for the individual notification (216). Such data can be used to further train or tune the machine learning models (282) using machine learning techniques such as those discussed above. For example, the historical data (274) for such a notification (216) can be used to tune a personalized machine learning model (282) for the same user profile (255) to which the notification was presented and/or to tune a general machine learning model (282) that can be used for multiple user profiles (255). The resulting updated machine learning models (282) can then be used for selecting times to trigger subsequent notifications (216) using the techniques discussed above.

In addition to using the contextual data (270) to select the time to trigger the presentation of the notifications (216), the notification triggering engine (264) may use the contextual data (270) to determine a manner of presenting the notification (216). For example, this can include dictating that the notification (216) is to be displayed in a way that reduces interference with a current user interface activity, as compared to a default manner of displaying the notification (216). As an example, current state data (272) may indicate that a lower right corner of a display (212) is currently being actively used, when that lower right corner is a default display position for a current notification (216). In that situation, if the notification (216) is to be triggered at the present time, then the notification triggering engine may determine that the notification (216) is to be displayed in a position other than the default position, such as an upper left corner of the display (212). As another example, if a user interface device (210) is currently being used for an audio call using a speaker, then the triggering engine (264) may decide to trigger a visual notification on the display (212), when the notification (216) would have played audibly on a speaker (214) by default. Determinations on the manner of display of a notification (216) using contextual data (270) can be made using models, such as the machine learning models (282) and/or rule-based models (284) discussed above.

Figure 3:
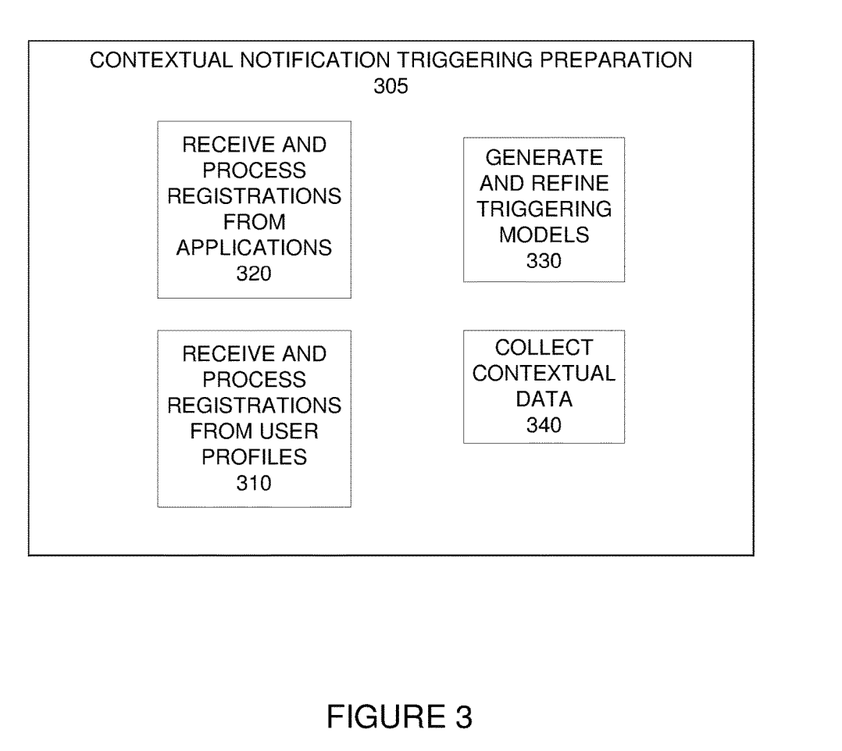
FIG. 3 is a block diagram of example acts in contextual notification triggering preparation.

B. Example Techniques Using Contextual User Interface Notification Triggering System Example techniques that may be performed using the system (200) of FIG. 2 will now be discussed with continued reference to FIG. 2 and with reference to FIG. 3 or FIG. 4. Referring to FIG. 3 and still to FIG. 2, techniques for contextual notification preparation (305) can prepare the notification manager (260) and associated data stores for performing contextual notification triggering at runtime. These acts of preparation (305) may be performed prior to runtime processing of notifications (216) using contextual notification triggering and may continue during runtime contextual notification triggering. Also, the acts of preparation (305) may be performed in parallel and/or in series with each other and with other acts performed by components of the system (200). For example, the preparation (305) can include receiving and processing (320) registration data (290) from applications (232) and receiving and processing (310) registration data (290) from user profiles, as discussed above. The preparation (305) can also include generating and refining (330) triggering models to be used in contextual notification triggering. For example, this can include defining rule-based models (284) and/or performing machine learning techniques on machine learning models (282). The preparation (305) can also include collecting (340) contextual data (270) to be used by the notification triggering engine (264) in selecting triggering times for the notifications (216). While some contextual data (270) (such as historical data (274) and settings data (276)) may be collected prior to runtime processing of notifications (216), other contextual data (270) (such as current state data (272)) may be collected at runtime, as discussed below.

Figure 4:
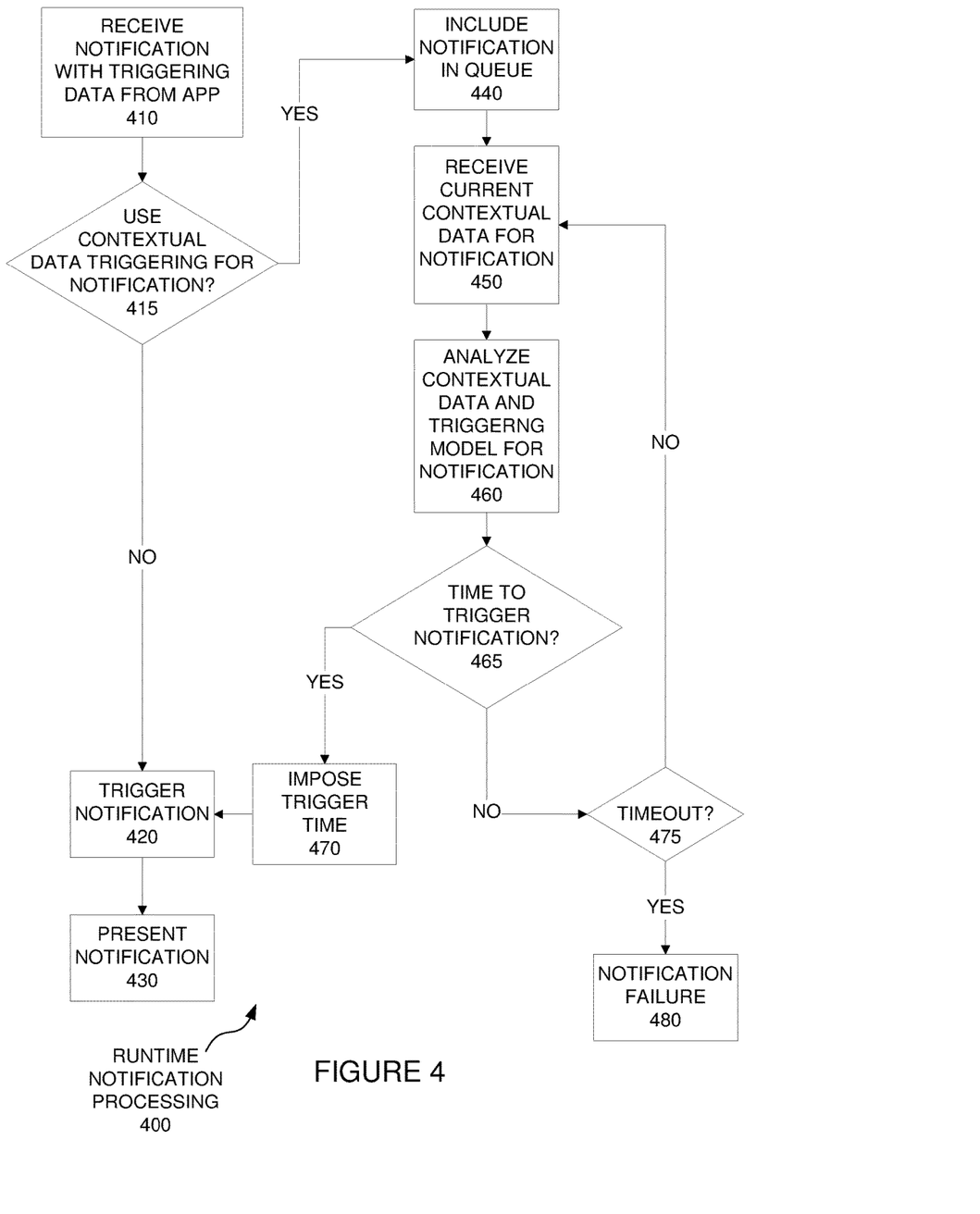
FIG. 4 is a flow diagram of an example of runtime notification processing.

Referring now to FIG. 4 and still to FIG. 2, acts for runtime notification processing (400) will be discussed. The acts of FIG. 4 are illustrated as an example for processing a single notification (216), for convenience and clarity. However, the system (200) can process multiple different notifications (216) from multiple different applications (232) in series and/or in parallel with each other, and such processing may differ from this specific example. For example, the notification queue (262) may include multiple notifications (216) that may all be triggered at the same time upon a change in the current state data (272) for a corresponding user profile (255).

The acts of the notification processing (400) can include receiving (410) a notification (216), possibly along with triggering data (218), from an application (232). The notification manager (260) can determine (415) whether contextual data triggering is to be used for the notification (415), such as by analyzing opt-in data in the triggering data (218) and/or in the registration data (290). If contextual data triggering is not to be used for the notification (216), the notification (216) can be triggered (420) without imposed delay, which can result in the notification (216) being presented (430) on a user interface device (210) without additional imposed delay by the notification manager (260). For example, the triggering (420) can include sending a command to a user interface component to present the notification, and may also include retrieving data for displaying the notification (216) from the notification queue (262) and/or from some other component in the system (200).

If it is determined (415) that contextual data triggering is to be used for the notification (216), the notification (216) can be included (440) in the notification queue (262) to await triggering. The triggering engine (264) can receive contextual data (270), such as receiving (450) current state data (272) relevant to current contextual circumstances for the notification (216). Some contextual data (270) may have been received prior to receiving (410) the notification (216). The triggering engine (264) can analyze (460) the contextual data (270) and the triggering model(s) (280) that apply to the individual notification (216). Using the results of that analysis, the triggering engine (264) can determine (465) whether it is time to trigger the notification (216). If so, the triggering engine (264) can impose (470) a triggering time and can trigger (420) the notification (216) at the selected time, so that the notification (216) is presented (430) without further delay being imposed after the imposed triggering time. For example, the triggering time can be the same as the current time when the trigger time imposition (470) is performed, or a time soon thereafter (e.g., one second later, a fraction of a second later, or some other time period). The imposed triggering time can be such that the current state data (272) used in the time selection is highly likely to still reflect a current state when the notification is presented (430). Multiple acts from FIG. 4, such as the analyzing (460), the determining (465), and the imposition (470) may be included in the overall act of selecting a triggering time, as discussed herein. Also, some of these acts, as with others discussed herein, may be combined into a single act.

If the system (200) determines (465) that it is not time to trigger the notification (216), then the system (200) can determine (475) whether a timeout has been reached according to a rule. For example, the timeout may be a threshold amount of time the notification (216) has been pending in the notification queue (262), a threshold number of determinations (465) without the notification (216) being triggered, and/or some other threshold. If it is determined that the timeout has been reached, a notification failure action (480) can be performed, such as by notifying the corresponding application (232) that its notification (216) was not presented and removing the notification (216) from the notification queue (262). If it is determined (465) that the timeout has not been reached, the processing of the notification (216) can proceed with additional receiving (450) of current contextual data for the notification (216) at a later time, re-analyzing (460) using that additional received current contextual data and determining (465) again whether it is time to trigger the notification.

III. Contextual State-Based User Interface Notification Triggering Techniques

Several contextual state-based user interface notification triggering techniques will now be discussed. Each of these techniques can be performed in a computing environment. For example, each technique may be performed in a computer system that includes at least one processor and memory including instructions stored thereon that when executed by at least one processor cause at least one processor to perform the technique (memory stores instructions (e.g., object code), and when processor(s) execute(s) those instructions, processor(s) perform(s) the technique). Similarly, one or more computer-readable memory may have computer-executable instructions embodied thereon that, when executed by at least one processor, cause at least one processor to perform the technique. The techniques discussed below may be performed at least in part by hardware logic. Features discussed in each of the techniques below may be combined with each other in any combination not precluded by the discussion herein, including combining features from a technique discussed with reference to one figure in a technique discussed with reference to a different figure. Also, a computer system may include means for performing each of the acts discussed in the context of these techniques, in different combinations.

Figure 5:
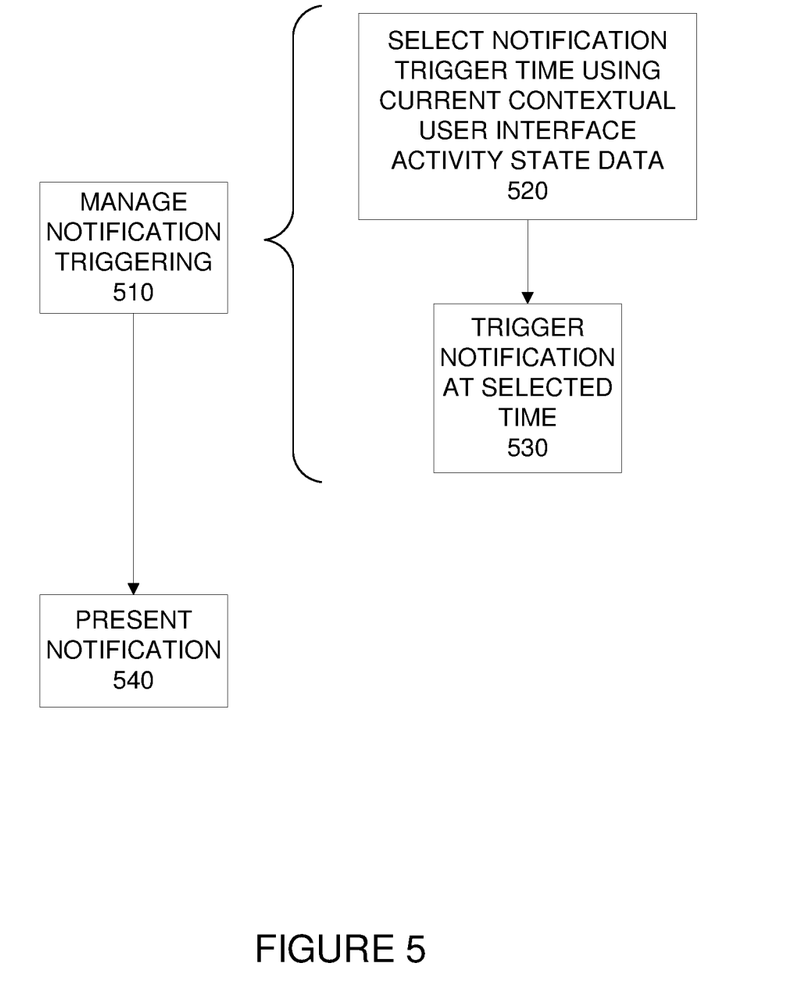
FIG. 5 is a flow diagram of a contextual state-based user interface notification triggering technique.

Referring to FIG. 5, a contextual state-based user interface notification triggering technique will be described. The technique can be directed to notification triggering using data representing a current contextual user interface activity state in a computer system. The technique can include managing (510) triggering of user interface notifications for a plurality of computer applications via a digital assistant, which can include a notification triggering engine and can operate in the computer system. The managing (510) can include selecting (520) a time to trigger a user interface notification from a computer application of the plurality of computer applications. The selecting (520) can use the data representing the current contextual user interface activity state in the computer system. The current contextual user interface activity state can be a state other than a state of the digital assistant or a state of the computer application (though one or more states of the digital assistant and/or the computer application may also be used). The technique can further include, in response to the selecting (520) of the time, triggering (530) the notification in the computer system at the selected time via the digital assistant. Further, the technique can include responding to the triggering (530) of the notification by presenting (540) the notification on a user interface device in the computer system (e.g., using a visual display and/or speakers).

The selecting (520) of the time to trigger the notification in the technique of FIG. 5 can include using data representing historical contextual user interface activity, such as where such historical contextual user interface activity data is used to tune a machine learning triggering model, as discussed above.

The current contextual user interface activity state can represent an activity of a user profile, such as an interaction of the user profile in a user interface of the computer system. The presenting (540) of the notification can include presenting the notification to the user profile. The user interface device on which the notification is presented can be a first user interface device, and the activity of the user profile can be an activity on a second user interface device that is separate from the first user interface device.

The selected time can be a current time, and the triggering can be performed while the current contextual user interface activity state continues. Also, the presenting of the notification on the user interface device can be performed while the current contextual user interface activity state continues.

The selecting (520) of the time to trigger can include processing the data representing the current contextual user interface activity state using a notification triggering model. The notification triggering model can include a machine learning model. The current contextual user interface activity state can represent an activity of a first user profile, and the notification can be presented to the first user profile. The technique can include training the machine learning model using activities of user profiles other than the first user profile and may also include using activities of the first user profile. The triggering model may include a rule-based model, which can include a set of one or more discrete filtering rules. Also, the triggering model may include both a rule-based model and a machine learning model.

The selecting (520) of the time to trigger can further include using data representing a contextual non-user interface state in the computer system. For example, the non-user interface state in the computer system may include an indicator of a number of notifications that are queued in the computer system and waiting to be presented to a user profile to which the notification is presented. Also, data representing the current contextual user interface activity state can include an indicator of recent notifications that have been presented to a user interface to which the notification is presented.

The technique may further include using the data representing the current contextual user interface activity state to select a manner of presenting the notification. The presenting (540) of the notification can include presenting the notification in the selected manner.

The selecting (520) of the time for triggering the notification may include delaying the notification until the current contextual user interface activity state changes to a different state. Also, the current contextual user interface activity state may be a first current contextual user interface activity state, and the selecting (520) of the time can include using data representing a second current contextual user interface activity state that occurs after the first current contextual user interface activity state.

Figure 6:
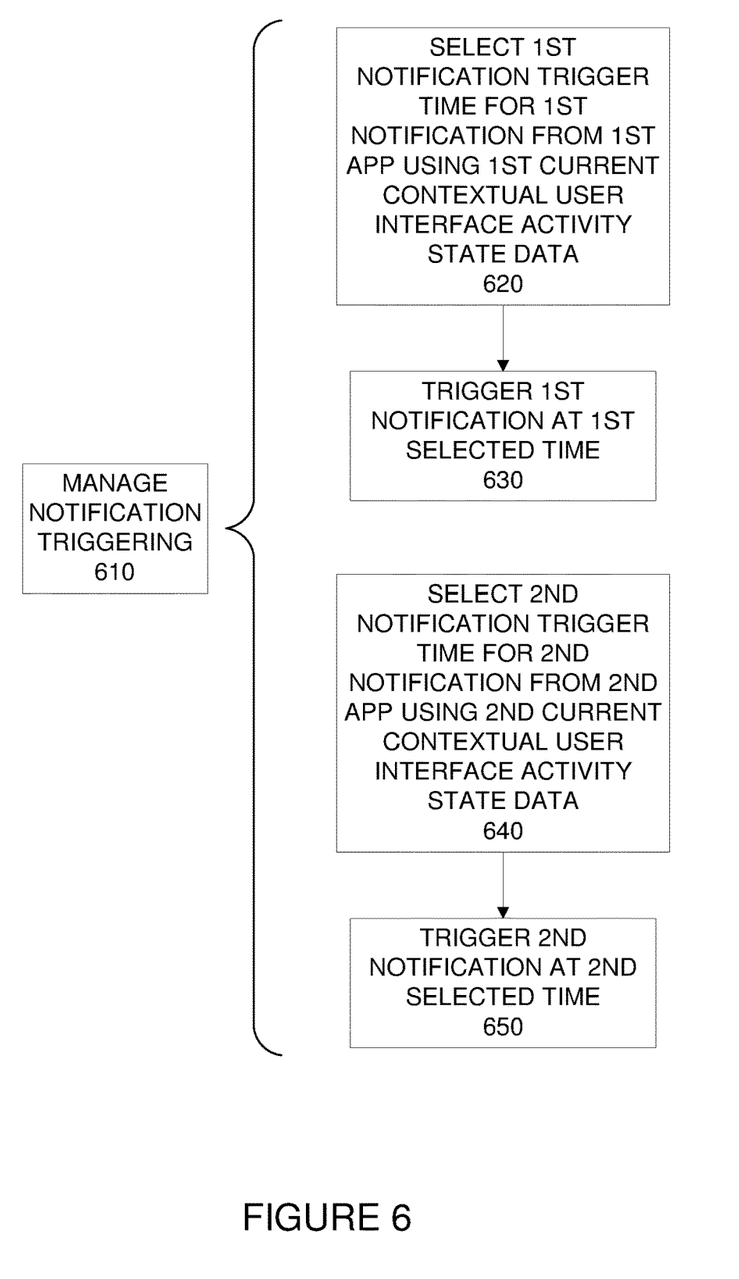
FIG. 6 is a flow diagram of another contextual state-based user interface notification triggering technique.

Referring now to FIG. 6, another state-based user interface notification triggering technique will be described. The technique can include managing (610) triggering of user interface notifications for a plurality of computer application via a notification triggering engine operating in a computer system. The managing (610) may include selecting (620) a first time to trigger a first user interface notification from a first computer application of the plurality of computer applications. The selecting (620) can use the data representing the current contextual user interface activity state in the computer system, with the current contextual user interface activity state being a state other than a state of the notification triggering engine or a state of the first computer application (though one or more states of the notification triggering engine and/or the first computer application may also be used). In response to the selecting of the first time, the first notification can be triggered (630) in the computer system at the selected time via the notification triggering engine. The technique of FIG. 6 can also include selecting (640) a second time to trigger a second user interface notification from a second computer application of the plurality of computer applications. The selecting (640) of the second time can use data representing a second current contextual user interface activity state in the computer system. The second current contextual user interface activity state can be a state other than a state of the notification triggering engine or a state of the computer application. Also, the second current contextual user interface activity state can occur at a different time than the first current contextual user interface activity state. In response to the selecting (640) of the second time, the second notification can be triggered (650) in the computer system at the second time via the notification triggering engine. The first notification may be presented on a first user interface of a first user interface device in the computer system in response to the triggering (630) and the second notification may be presented on a second user interface of a second user interface device in the computer system in response to the triggering (650).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method of notification triggering using data representing a current contextual user interface activity state, with the method comprising:
    managing triggering of user interface notifications for a plurality of computer applications via a digital assistant operating in a computer system, with the managing comprising:
    selecting a time to trigger a user interface notification from a computer application of the plurality of computer applications, with the selecting using the data representing the current contextual user interface activity state in the computer system, and with the current contextual user interface activity state being a state other than a state of the digital assistant or a state of the computer application; and
    in response to the selecting of the time, triggering the notification in the computer system at the selected time via the digital assistant; and
    in response to the triggering of the notification, presenting the notification on a user interface of a user interface device in the computer system, wherein the current contextual user interface activity state represents an activity of a user profile, and wherein the user interface device is associated with the user profile.

2. The method of claim 1, wherein the user interface device on which the notification is presented is a first user interface device, and wherein the activity of the user profile is an activity on a second user interface device that is separate from the first user interface device.

3. The method of claim 1, wherein the triggering is performed while the current contextual user interface activity state continues.

4. The method of claim 1, wherein the presenting of the notification on the user interface device is performed while the current contextual user interface activity state continues.

5. The method of claim 1, wherein the selecting of the time to trigger comprises processing the data representing the current contextual user interface activity state using a notification triggering model, and wherein the notification triggering model comprises a machine learning model.

6. The method of claim 5, wherein the current contextual user interface activity state represents an activity of a first user profile, wherein the notification is presented to the first user profile, and wherein the method further comprises training the machine learning model using activities of user profiles other than the first user profile.

7. The method of claim 5, wherein the current contextual user interface activity state represents an activity of a first user profile, wherein the notification is presented to the first user profile, and wherein the method further comprises training the machine learning model using activities of the first user profile and activities of a plurality of user profiles other than the first user profile.

8. The method of claim 1, wherein the selecting of the time to trigger comprises processing the data representing the current contextual user interface activity state using a notification triggering model, and wherein the notification triggering model comprises a rule-based model comprising a set of one or more discrete filtering rules.

9. The method of claim 1, wherein the selecting of the time to trigger comprises processing the data representing the current contextual user interface activity state using a notification triggering model, and wherein the notification triggering model comprises a rule-based model comprising a set of one or more discrete filtering rules, and a machine learning model.

10. The method of claim 1, wherein the selecting of the time to trigger further comprises using data representing a contextual non-user interface state in the computer system, and wherein the contextual non-user interface state in the computer system comprises an indicator of a number of notifications that are queued in the computer system and waiting to be presented to a user profile to which the notification is presented.

11. The method of claim 1, wherein data representing the current contextual user interface activity state comprises an indicator of recent notifications that have been presented to a user interface to which the notification is presented.

12. The method of claim 1, wherein the method further comprises using the data representing the current contextual user interface activity state to select a manner of presenting the notification, and wherein the presenting of the notification comprises presenting the notification in the selected manner.

13. The method of claim 1, wherein the managing of the triggering of user interface notifications comprises receiving, from the application, a mapping of the user interface notification to a notification category, and using the mapping in the selecting of the time to trigger the user interface notification.

14. The method of claim 1, wherein the managing of the triggering of user interface notifications comprises receiving, from the application, identifications of a plurality of user profiles to which the notification is to be provided, and wherein the presenting of the notification comprises presenting the notification to at least one of the plurality of user profiles.

15. The method of claim 1, wherein the managing of the triggering of user interface notifications comprises determining whether or not the user interface notification is subject to contextual notification triggering, and wherein the selecting of the time to trigger the user interface notification is performed in response to determining that the user interface notification is subject to contextual notification triggering.

16. A computer system comprising:
   at least one processor; and
   memory comprising instructions stored thereon that when executed by at least one processor cause at least one processor to perform acts of notification triggering using data representing a current contextual user interface activity state in the computer system, with the acts comprising:
   managing triggering of user interface notifications for a plurality of computer applications via a notification triggering engine operating in the computer system, with the managing comprising:
   selecting a time to trigger a user interface notification from a computer application of the plurality of computer applications, with the selecting using the data representing the current contextual user interface activity state in the computer system, and with the current contextual user interface activity state being a state other than a state of the notification triggering engine or a state of the computer application; and
   in response to the selecting of the time, triggering the notification in the computer system at the selected time via the notification triggering engine, wherein the current contextual user interface activity state represents an activity of a user profile, and wherein the triggering of the notification comprises triggering the notification to be presented on a user interface device that is associated with the user profile.

17. The computer system of claim 16, wherein the computer application is a first application, the notification is a first notification, the time to trigger is a first time to trigger, the current contextual user interface activity state is a first current contextual user interface activity state, and managing further comprises:
   selecting a second time to trigger a second user interface notification from a second computer application of the plurality of computer applications, with the selecting of the second time using data representing a second current contextual user interface activity state in the computer system, with the second current contextual user interface activity state being a state other than a state of the notification triggering engine or a state of the computer application, and with the second current contextual user interface activity state occurring at a different time than the first current contextual user interface activity state; and
   in response to the selecting of the second time, triggering the second notification in the computer system at the second time via the notification triggering engine.

18. The computer system of claim 16, wherein the selecting of the time comprises delaying the notification until the current contextual user interface activity state changes to a different state, wherein the current contextual user interface activity state is a first current contextual user interface activity state, and wherein the selecting of the time comprises using data representing a second current contextual user interface activity state that is after the first current contextual user interface activity state.

19. A computer system comprising:
   at least one processor; and
   memory comprising instructions stored thereon that when executed by at least one processor cause at least one processor to perform acts of notification triggering using data representing a current contextual user interface activity state in the computer system, with the acts comprising:
   managing triggering of user interface notifications for a plurality of computer applications via a notification triggering engine operating in a computer system, with the managing comprising:
   selecting a time to trigger a user interface notification from a computer application of the plurality of computer applications, with the selecting using the data representing the current contextual user interface activity state in the computer system, and with the current contextual user interface activity state being a state other than a state of the notification triggering engine or a state of the computer application; and
   in response to the selecting of the time, triggering the notification in the computer system at the selected time via the notification triggering engine; and
   in response to the triggering of the notification, presenting the notification on a user interface of a user interface device in the computer system, wherein the current contextual user interface activity state represents an activity of a user profile, and wherein the user interface device is associated with the user profile.

20. The computer system of claim 19, wherein the user interface device on which the notification is presented is a first user interface device, and wherein the activity of the user profile is an activity on a second user interface device that is separate from the first user interface device.

* * * * *